Figure 1:
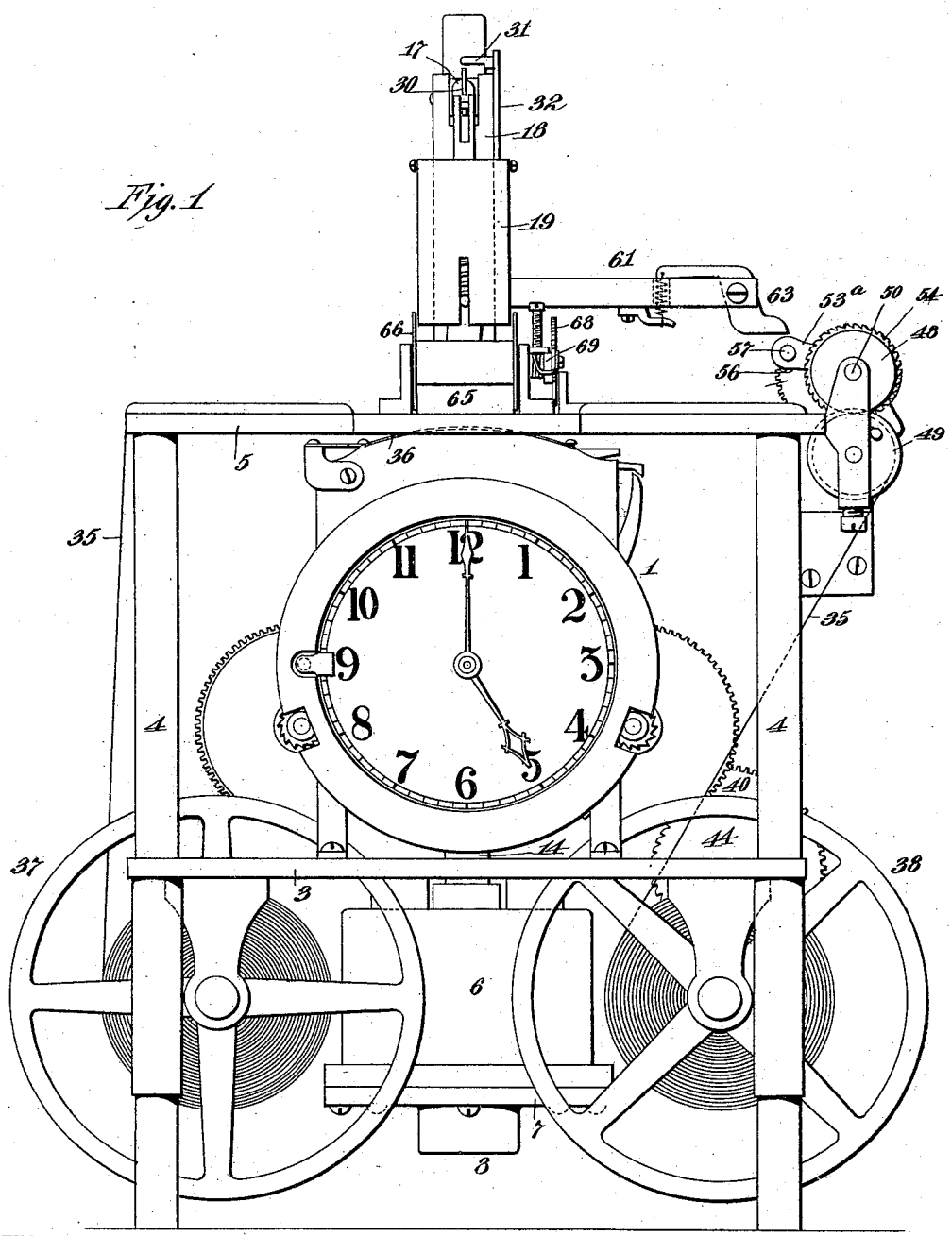

No. 694,327. Patented Feb. 25, 1902.
G. J. SCHOEFFEL & H. W. AYLWARD.
SIGNAL RECORDING MECHANISM.
(Application filed Dec. 1, 1899. Renewed Jan. 13, 1902.)

(No Model.) 5 Sheets—Sheet 1.

Witnesses: Inventors

No. 694,327. Patented Feb. 25, 1902.
G. J. SCHOEFFEL & H. W. AYLWARD.
SIGNAL RECORDING MECHANISM.
(Application filed Dec. 1, 1899. Renewed Jan. 13, 1902.)

(No Model.) 5 Sheets—Sheet 2.

No. 694,327. Patented Feb. 25, 1902.
G. J. SCHOEFFEL & H. W. AYLWARD.
SIGNAL RECORDING MECHANISM.
(Application filed Dec. 1, 1899. Renewed Jan. 13, 1902.)
(No Model.) 5 Sheets—Sheet 3.
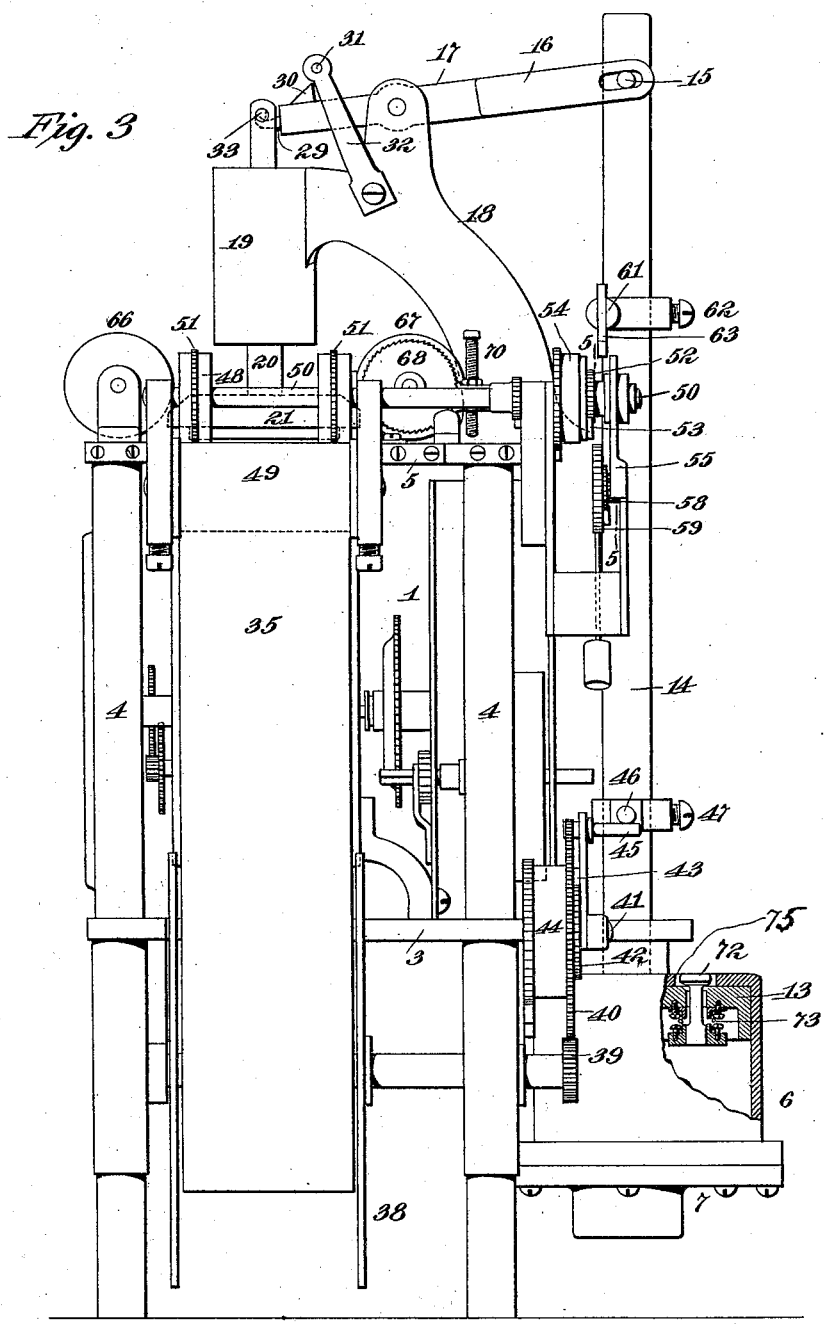
Witnesses: Inventors No. 694,327. Patented Feb. 25, 1902.
G. J. SCHOEFFEL & H. W. AYLWARD.
SIGNAL RECORDING MECHANISM.
(Application filed Dec. 1, 1899. Renewed Jan. 13, 1902.)
(No Model.) 5 Sheets—Sheet 4.
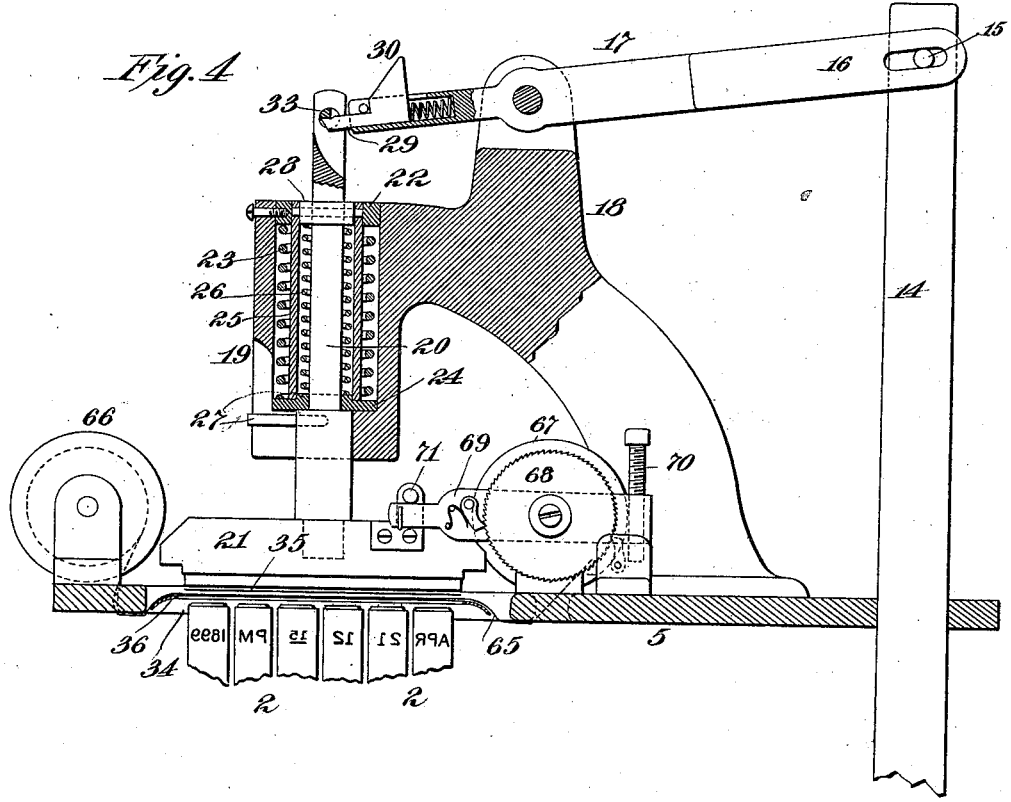
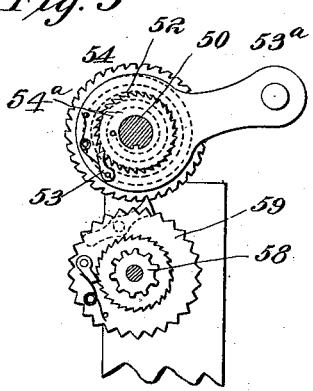
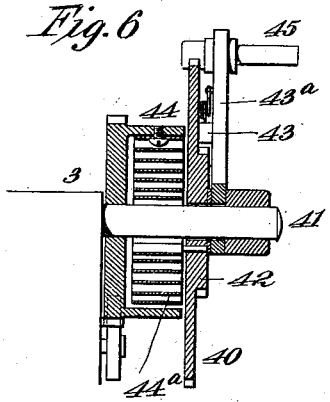
Witnesses:
Inventors

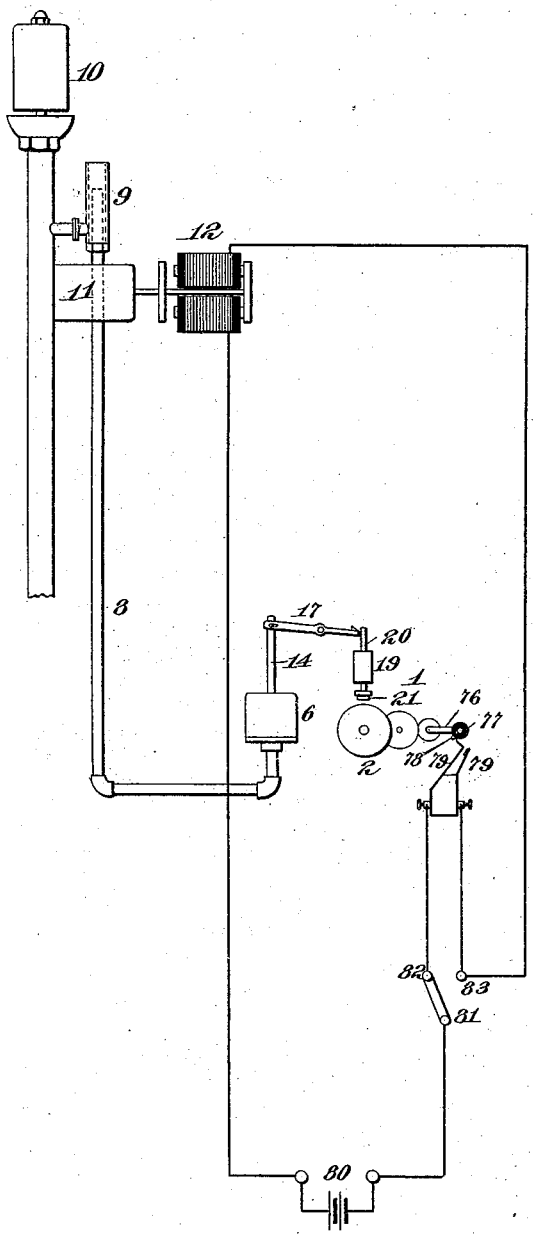

UNITED STATES PATENT OFFICE.

GEORGE J. SCHOEFFEL, OF NEW YORK, AND HENRY W. AYLWARD, OF BROOKLYN, NEW YORK, ASSIGNORS, BY DIRECT AND MESNE ASSIGNMENTS, TO THE SIGNAL AND CONTROL COMPANY, OF NEW YORK, N. Y., A CORPORATION OF WEST VIRGINIA.

SIGNAL-RECORDING MECHANISM.

SPECIFICATION forming part of Letters Patent No. 694,327, dated February 25, 1902.

Application filed December 1, 1899. Renewed January 13, 1902. Serial No. 89,486. (No model.)

*To all whom it may concern:*

Be it known that we, GEORGE J. SCHOEFFEL, of the borough of Manhattan, and HENRY W. AYLWARD, of the borough of Brooklyn, city and State of New York, citizens of the United States, have invented a certain new and useful Improvement in Signal-Recording Mechanism, of which the following is a description.

Our invention relates to various new and useful improvements in signal-recording mechanism of the type adapted to make a record on a tape of the successive blasts of a steam-whistle or other signal, the device coöperating with time-operated mechanism, whereby a permanent record will be secured of the approximate time at which each blast of the whistle or the corresponding operation of any other form of signaling device was produced.

Our invention relates particularly to improvements in the devices of this character which are covered in the Colgate patents, No. 579,221, March 23, 1897, and No. 605,197, June 7, 1898. With the Colgate device the operation of the steam-whistle exhausted air from a cylinder the piston of which being operated by atmospheric pressure resulted in the movement of intermediate devices brought into play by reason of differences in air-pressure, and by means of such intermediate devices a hammer was actuated which caused a tape-like strip of paper to be momentarily engaged with a time-stamp to print a visual record of the time. With the prior device provision was made also for the automatic operation of the whistle at regular and predetermined intervals—as, for instance, during a fog—and the said automatic mechanism required the employment of a separate timepiece for actuating a circuit-controlling device for the valve mechanism of the whistle.

Our objects are principally to improve and simplify the construction of device described in said patents. To this end we have materially improved the construction and operation of the mechanism for operating the hammer at each blast of the whistle or corresponding operation of any other signaling device.

With our improvement we use a vacuum-cylinder, as suggested by Colgate, and exhaust the air therefrom by the usual exhaust-pipe, and we connect the piston of said cylinder through a rocking arm with the plunger of the printing-hammer, the connections being such that near the completion of the positive stroke of the piston the said plunger will be released, allowing a spring to operate the hammer to force the paper into momentary engagement with the dating-wheels, whereupon the hammer returns to its normal position, so as to release the pressure of the paper upon the dating-wheels. The intermediate connections between the piston and the hammer are not only simple in construction, but by momentarily engaging the paper with the dating-wheels the accuracy of the timepiece will not be impaired.

We aim to improve the construction of the prior device by employing only a single timepiece, which not only actuates the dating-wheels, but also operates a circuit-controlling device which may be brought into play when the automatic operation of the blast is desired. We further improve the construction of the prior device in minor details relating to the mechanism for feeding the inking-ribbon, for feeding the strip on which the printing is effected, for taking up the slack in said strip, &c.

In order that our improvements may be better understood, attention is directed to the accompanying drawings, forming part of this specification, and in which—

Figure 2:
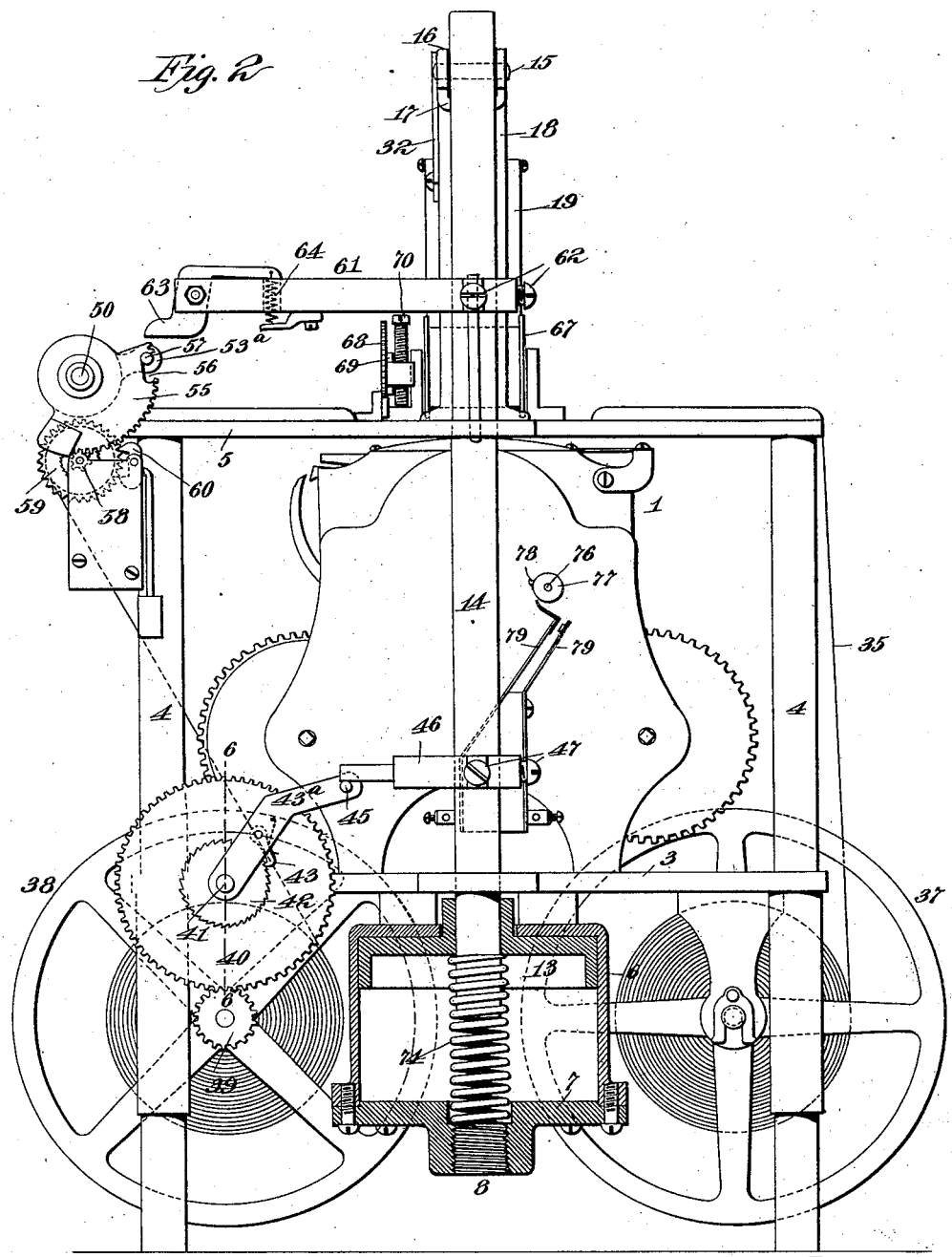

Figure 1 is a front elevation; Fig. 2, a rear view showing the vacuum-cylinder in section; Fig. 3, a side elevation; Fig. 4, an enlarged sectional view illustrating particularly the construction of the hammer mechanism and of the feed mechanism for the inking-ribbon. Figs. 5 and 6 are sections on the lines 5 5 and 6 6 on Figs. 3 and 2, respectively; and Fig. 7, a diagram.

In all of the above views corresponding parts are represented by the same numerals of reference.

1 represents a timepiece of any suitable character, and 2 2 are suitable dating-wheels, some of which, representing hours and minutes, are operated directly by said timepiece. Generally the dating-wheels representing months, days, and years are shifted by hand at the proper times. The timepiece 1 is carried on a base 3, from which standards 4 extend, which standards carry at their upper ends a top plate 5. Mounted beneath the base 3 is a vacuum-cylinder 6, having a removable head 7, with which an exhaust-pipe 8 connects. This exhaust-pipe, as described in the said patents to Colgate, extends at its upper end into a chamber 9, into which steam may be admitted when the whistle 10 is blown, whereby a partial vacuum will be formed around the mouth of said exhaust-pipe 8 to exhaust the air from the cylinder 6. An electrically-controlled valve 11, of any suitable type, operated by the magnets 12, admits or cuts off the steam to and from the whistle. Mounted in the cylinder 6 is a piston 13, the rod 14 of which extends vertically upward and takes in proper bearings in the base 3 and top plate 5. The piston-rod 14 is provided near its top with a pin 15, which coöperates with a yoke 16 of a walking-beam 17, pivoted in a bearing 18, secured to the top plate 5. The bearing 18 carries a plunger-head 19, (see Fig. 4,) in which is mounted a plunger 20 of a hammer 21.

22 is a collar secured within the plunger-head at its upper end, and 23 is a heavy spiral spring working between said collar and a collar 24, which takes against a shoulder on the plunger 20, as shown. A sleeve 25 is connected with the plunger within the spring 23, as shown. Mounted within said sleeve 25 and surrounding the plunger is a light spiral spring 26, which at its bottom bears against an extension 27 on the collar 24, and at its top the said spring bears against a collar 28, which is carried by the plunger 20. In Fig. 4 the plunger 20 and hammer 21 are shown in their normal positions. It will be observed that the hammer 21 can be moved downward slightly against the tension of the spring 26, as, in fact, occurs by reason of the momentum of the hammer in the operation, as will be explained. The walking-beam 17 is slotted at its end and carries a longitudinally-movable hook 29 therein, spring-pressed outward and provided with a cam portion 30. The said cam 30 engages a pin 31, (see Fig. 3,) carried by a bracket 32, near the end of the upward movement of the plunger, so as to draw the hook 29 inward and disengage it from a pin 33 on said plunger. The top plate 5 is formed with an opening 34 therein, in which the dating-wheels 2 are located, and over said opening runs the tape or strip 35. Generally a light shield 36 extends over the dating-wheels, said shield being formed with a slot therein through which the impression can be made. The strip 35 runs off of a reel 37 and onto a take-up reel 38. The shaft of the take-up reel is formed with a pinion 39 thereon, with which a gear 40 engages, said gear being loosely mounted on a shaft 41. The gear 40 carries a ratchet-wheel 42, with which a pawl 43 engages, the arm carrying said pawl being normally elevated by means of a spring 44$^a$, which is coiled in a barrel 44 in the usual way. (See Fig. 6.) The pawl-arm 43$^a$ carries a pin 45 at its end, with which an arm 46 engages, said arm being adjustably secured to the piston-rod 14 by means of adjusting-screws 47. Thus the movement of the pawl-arm 43$^a$ by the operation of the piston-rod can be regulated. The strip 35 passes between feed-rolls 48 and 49, the upper of said rolls being keyed to a shaft 50, to which a feed movement is given. In order that the feed-roll 49 may positively engage the strip, it is provided, preferably, with two lines of teeth 51 51 therein. The shaft 50 carries a ratchet-wheel 52, with which a pawl 53 engages, the arm 53$^a$, carrying said pawl, being normally elevated by means of a spring 54$^a$, located in a spring-barrel 54 and of common construction. (See dotted lines in Fig. 5.) In order to provide for a gradual return movement of the feed-pawl to prevent shock in the operation, we preferably mount a segment 55 loosely on the shaft 50 and provide said segment with a slot 56, with which a pin 57, carried on the pawl-arm 53$^a$, engages, so as to allow for a slight movement of the pawl-arm before the segment 55 is moved. The segment 55 engages with a pinion 58, which connects by a ratchet and pawl with an escape-wheel 59, with which an escape-pallet 60 engages. Upon the downstroke of the pawl-arm the segment will be carried with it, carrying the pinion 58 with the ratchet and not disturbing the escape-wheel 59; but on the return movement of these parts under the effect of the spring in the spring-barrel 54 the escape-pallet 60 will operate and allow the parts to return slowly. The piston-rod 14 carries an arm 61, which is adjustable by means of adjusting-screws 62, and said arm carries at its end a lever 63, which on the downstroke engages the pin 57, so as to carry the pawl-arm 53$^a$ downward. Near the end of the downstroke of the piston-rod 14 the lever 63 will clear the pin 57, and on the return movement of the arm 61 the lever 63 will be swung pivotally by the engagement with the pin 57 against the tension of a spring 64.

Mounted beneath the strip 35 and above the impression-wheels 2 is the usual inking-ribbon 65, carried on the reels 66 and 67. The reel 67 is operated by a ratchet-wheel 68, with which a pawl-arm 69 coöperates, return movement of said pawl-arm being effected by a suitable spring and being limited by an adjusting-screw 70, as shown. The hammer carries an arm 71, which engages over the pawl-arm 69, so that upon the positive stroke of the hammer a feed movement of the ribbon 65 will be effected, as will be understood. In order that the piston 13 of the vacuum-cylinder may return after it has made its positive stroke, said piston is provided with a valve 72 therein, which is normally held open by means of a spring 73. The tension of the spring 73 is only sufficient to keep the valve 72 normally elevated and in an open position, so that when a vacuum is created in the cylinder 6 the air-pressure will tend to close the valve 72, whereupon the piston 13 may be forced downward against the tension of a spring 74. When the blast has ceased, the spring 73 will again open the valve 72, allowing air to enter the cylinder, whereupon the spring 74 will rapidly return the cylinder to its normal position. Air is admitted to the cylinder through an opening 75 in its upper wall.

In order that the device may be used for automatic signaling—i. e., the automatic operation of the whistle at predetermined intervals—we carry upon one of the shafts 76 of the timepiece 1 a smooth wheel 77, made, preferably, of insulating material. The shaft 76 is preferably the escapement-shaft of the timepiece, so that it makes a complete rotation each minute. The wheel 77 carries a pin 78, which closes a contact between two contact-springs 79 79, as will be understood. Referring to Fig. 7, it will be seen that the contacts 79 are in circuit with the control-magnets 12, with a battery 80, and with a switch-arm 81, which may be engaged with a contact 82 when the automatic operation of the whistle is to be effected. A contact 83 short-circuits the contacts 79, so that the switch-arm 81 may be moved by hand into engagement with said contact 83 to operate the whistle manually when such operation is desired.

The operation of our improved device is as follows: The timepiece 1, either alone or supplemented by the usual manual operation, rotates the several dating-wheels 2 2, as with the well-known dating-stamps. Assuming the device to be operating automatically, the switch 81 will be moved into engagement with the contact-plate 82, so that at regular recurring periods of time—as, for instance, each minute—the circuit of the control-magnets 12 will be closed at the contacts 79 and kept closed as long as may be desired. The operation of the magnets 12 in the ordinary way allows steam to pass the valve 11 and operate the whistle 10. The steam in rushing through the chamber 9 passes the opening of the exhaust-pipe 8, exhausts air from the cylinder 6, and causes a rush of air past the valve 72, which immediately closes. As soon as the valve 72 closes the piston 13 will be forced downward by the atmospheric pressure and the walking-beam 17 will be operated, elevating the plunger 20 and the hammer 21. When the plunger reaches the top of its upstroke, the cam 30, engaging the finger 31, will disengage the walking-beam from the plunger, which will thereupon be forced downward by the spring 23. The collar 24 will reach the end of its bottom travel before the hammer 21 will engage the strip of paper, but the momentum of the hammer will carry it onward and force the strip onto the inking-ribbon 65 to produce an impression from the dating-wheels 2. This further movement of the hammer takes place against the tension of the spring 26, which immediately returns the hammer to its normal position, so as to free the paper and relieve the dating-wheels of any resistance tending to produce aberrations in the time. The piston 13 will be kept down as long as the blast is prolonged by the reduction in pressure within the cylinder 6; but as soon as the blast stops the exhaust in the cylinder 6 will be relieved, allowing the spring 73 to once again open the valve 72, whereby air will enter the cylinder 6 and the spring 74 will return the piston 13 rapidly to its normal position. By providing the valve 72 in the piston 13 a sufficient quantity of air will enter the cylinder 6 after the blast has been stopped as to allow the piston to be returned with sufficient rapidity as to enable the device to operate when the blasts succeed each other with great rapidity. On the down-stroke of the piston 13, which provides for the elevation of the plunger 20, the lever 63 will engage the pin 57 of the paper-feed mechanism, moving the pawl-arm 53ª downward, engaging the ratchet-wheel 52, and effecting a feed movement of the strip 35. In this movement of the pawl-arm 53ª downward the pin 57 will engage the segment 55 to turn the pinion 58 against its ratchet connection with the escape-wheel 59. As the piston 13 reaches the end of its down movement the pin 57 will swing clear of the end of the lever 63, which will pass beneath the pin, whereupon the segment 55 will be returned without shock by the operation of the escapement-pallet 60. Thus it will be seen that in the case of a prolonged blast the elements comprising the paper-feeding mechanism will return to their normal positions while the piston 13 remains depressed, so that the maximum feed movement of the strip 35 will be effected and the several records will be separated to their maximum extent. If, however, the blasts follow each other in rapid succession, the segment 55, coöperating with the escapement-pallet 60, will prevent the pin 57 from returning entirely to its normal position before the pin is again moved downward by the next blast, so that the feed movement will be correspondingly reduced. Thus the record will show by the difference in the spaces separating the several records whether the blasts were of normal duration or whether they were short and rapidly recurrent. The downward movement of the piston-rod 14 carries the arm 46 with it and depresses the pawl-arm 43ª against the tension of the spring 44ª in the spring-barrel 44. When the piston-rod 14 again ascends, the said spring tends to return the pawl-arm 43ª, so as to rotate the ratchet-wheel 42 and the gear 40, thereby turning the pinion 39 and the shaft of the take-up reel. The maximum movement which will be given to the pawl-arm 43ª by the piston-rod 14 will be sufficient to enable the maximum slack in the strip 35 to be taken up. As the paper accumulates on the take-up reel it will be obvious that a shorter movement of the pawl-arm 43ᵃ will result in the taking up of the slack, or when the feed movements of the strip are short the same is true. Ordinarily in operation, therefore, the taking up of the slack does not permit the pawl-arm 43ᵃ to return to its full extent, it being obvious that the extent of the return movement of said pawl-arm will be arrested when the strip 35 has been drawn taut between the take-up reel and the feed-rolls. The improved take-up mechanism is therefore of a very simple character and provides for the taking up of much or little slack in the strip. The downward movement of the hammer 21 after the plunger 20 has been released from the walking-beam 17 engages the pawl-arm 69 and provides for a feed movement of the inking-ribbon, so that the impressions will be always clean and sharp. When it is desired to operate the device manually, the switch 81 is engaged with the contact-plate 83, so as to close the circuit on the control-magnets 12 and result in the operations already described. Obviously the blasts will be prolonged during the time the switch 81 is in engagement with said contact-plate, and the blast may be interrupted by disengaging the said switch from said plate.

It will be of course understood that the whistle 10 may be operated by a manually-controlled valve in the usual way instead of by the electrical devices explained, in which case the records of such blasts will be produced on the strip 35, as we have already described. Instead of controlling the whistle by means of a magnet the circuit to which is closed at the time-stamp or the manually-operated switch it will be understood that the whistle may be operated from the time-stamp in any equivalent way—as, for instance, by means of pneumatic devices, as described in Patent No. 632,207, dated August 29, 1899.

Having now described our invention, what we claim as new, and desire to secure by Letters Patent, is as follows:

1. In a signal-recording device, the combination of a signal, controlling mechanism for controlling said signal, a time-stamp, mechanism for effecting a record from the time-stamp at each operation of the signal, and means controlled by the time-stamp for operating said controlling mechanism, substantially as set forth.

2. In a signal-recording device, the combination of a signal, a controlling-magnet for controlling said signal, a time-stamp, mechanism for effecting a record from the time-stamp at each operation of the signal, a circuit including said magnet, a circuit-closer in said circuit adapted to be periodically closed by the time-stamp, and a switch in series with said circuit-closer, substantially as set forth.

3. In a signal-recording device, the combination of a signal, a controlling-magnet for controlling said signal, a time-stamp, mechanism for effecting a record from the time-stamp at each operation of the signal, a circuit including said magnet, a circuit-closer in said circuit adapted to be periodically closed by the time-stamp, a switch in series with said circuit-closer, and a contact-plate with which said switch may engage to short-circuit said circuit-closer, substantially as set forth.

4. In a signal-recording device, the combination of a time-stamp, a signal, a cylinder operated simultaneously with said signal, a piston in said cylinder, a walking-beam connected to said piston, a spring-pressed plunger, connections between the plunger and said walking-beam, means for releasing said connections, and a hammer carried by said plunger, substantially as set forth.

5. In a signal-recording device, the combination of a time-stamp, a signal, a cylinder operated simultaneously with said signal, a piston in said cylinder, a walking-beam connected to said piston, a spring-pressed plunger, a finger carried by said walking-beam engaging said plunger, a cam carried by said finger, a pin arranged in the path of said cam and with which the cam engages to disengage the finger from said plunger, and a hammer carried by said plunger, substantially as set forth.

6. In a signal-recording device, the combination of a whistle, a time-stamp, a vacuum-cylinder, an exhaust-pipe leading into said vacuum-cylinder and from which the air is exhausted simultaneously with the operation of the whistle, a piston in said cylinder, a normally open downwardly-movable valve in said piston, and means operated by the piston for effecting a record from the time-stamp, substantially as set forth.

7. A signal-recording mechanism comprising a signal, a time-stamp, a hammer arranged to effect a record from said time-stamp, a plunger carrying said hammer, a spring forcing the hammer toward the time-stamp, means for limiting the movement of said spring before the hammer engages the time-stamp, but permitting the said hammer to effect a record from the time-stamp by its momentum, and means for operating the plunger simultaneously with the signal, substantially as set forth.

8. A signal-recording mechanism comprising a signal, a time-stamp, a hammer arranged to effect a record from said time-stamp, a plunger carrying said hammer, a spring forcing the hammer toward the time-stamp, means for limiting the movement of said spring before the hammer engages the time-stamp, but permitting the said hammer to effect a record from the time-stamp by its momentum, a counteracting-spring for returning the hammer to its normal position, and means for operating the plunger simultaneously with the signal, substantially as set forth.

9. In a signal-recording device, the combination of a time-stamp, a signal, a hammer, mechanism for operating the hammer simultaneously with the signal, a tape-strip interposed between the hammer and the time-stamp and on which the records are made, and feed mechanism for said strip operated simultaneously with the signal and comprising a pair of feed-rolls, a pawl-arm for positively rotating one of said rolls, and means for effecting a retarded return movement of said pawl-arm, substantially as set forth.

10. In a signal-recording device, the combination of a time-stamp, a signal, a hammer, mechanism for operating the hammer simultaneously with the signal, a tape-strip interposed between the hammer and the time-stamp and on which the records are made, and feed mechanism for said strip operated simultaneously with the signal and comprising a pair of feed-rolls, a pawl-arm for positively rotating one of said rolls, and a segment coöperating with an escapement mechanism for effecting a retarded return movement of said pawl-arm, substantially as set forth.

11. In a signal-recording device, the combination of a time-stamp, a signal, a hammer, mechanism for operating the hammer simultaneously with the signal, a tape-strip interposed between the hammer and the time-stamp and on which the records are made, and feed mechanism for said strip operated simultaneously with the signal and comprising a pair of feed-rolls, a pawl-arm for positively rotating one of said rolls, and a segment coöperating with an escapement mechanism for effecting a retarded return movement of said pawl-arm, said segment being provided with a slot therein, whereby a portion of the movement of the pawl-arm will be made independent of said segment, substantially as set forth.

12. In a signal-recording device, the combination of a time-stamp, a cylinder, a piston therein, a hammer, connections between said hammer and the time-stamp, a tape-strip between the hammer and the time-stamp and on which the records are made, and feeding mechanism for said strip comprising two feed-rolls, a pawl-arm for moving said feed-rolls, an arm movable with the piston, and a pivoted lever on said arm coöperating with the pawl-arm, substantially as set forth.

13. In a signal-recording device, the combination of a time-stamp, a cylinder, a piston therein, a hammer, connections between said hammer and the time-stamp, a tape-strip between the hammer and the time-stamp and on which the records are made, and feeding mechanism for said strip comprising two feed-rolls, a pawl-arm for moving said feed-rolls, an arm movable with the piston, means for adjusting said arm, and a pivoted lever on said arm coöperating with the pawl-arm, substantially as set forth.

14. In a signal-recording device, the combination of a time-stamp, a tape-like strip, mechanism for effecting a record on said strip, mechanism for feeding the strip, and take-up mechanism for the strip coöperating with the mechanism for effecting the record and comprising a take-up reel, a pawl-arm, a spring for moving said pawl-arm to rotate the take-up reel, and means for positively moving the pawl-arm against the tension of said spring at the making of each record, substantially as set forth.

15. In a signal-recording device, the combination of a time-stamp, a pressure-cylinder, a piston in said cylinder, a hammer, connections between the piston and the hammer, a tape-like strip interposed between the hammer and the time-stamp, feed mechanism for said strip, and a take-up mechanism comprising a take-up reel, a pawl-arm, a spring for moving said pawl-arm to turn the take-up reel, and an arm movable with the piston for engaging the pawl-arm to move it downward against the tension of said spring simultaneously with the operation of making each record, substantially as set forth.

This specification signed and witnessed this 25th day of November, 1899.

GEO. J. SCHOEFFEL.
HENRY W. AYLWARD.

Witnesses:
WM. PELZER,
JNO. R. TAYLOR.